Oct. 16, 1962 J. B. HUTCHINSON 3,058,770
MATERIAL HANDLING PLATFORM
Filed Jan. 20, 1960
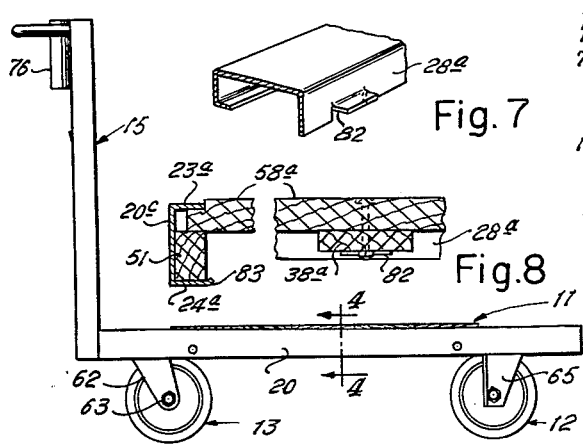
Fig. 7
Fig. 8
Fig. 1
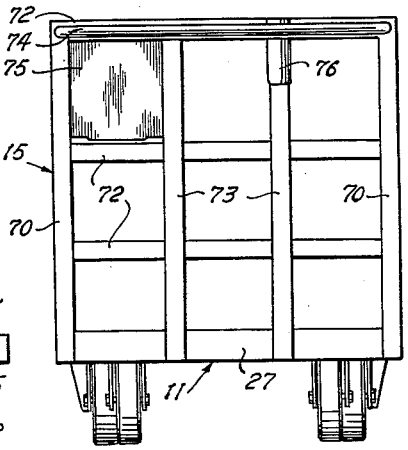
Fig. 2
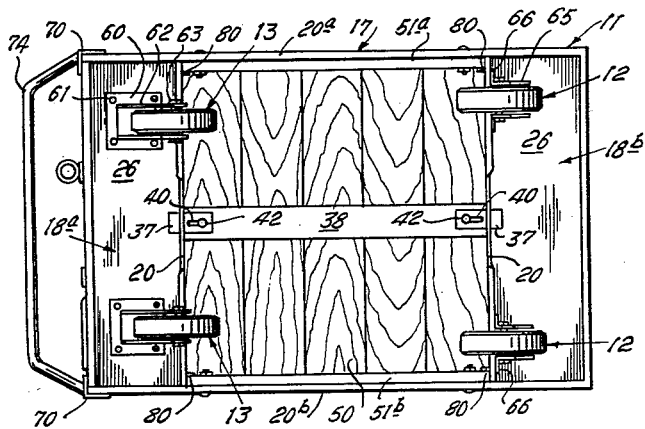
Fig. 3
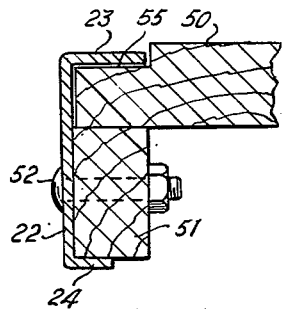
Fig. 4
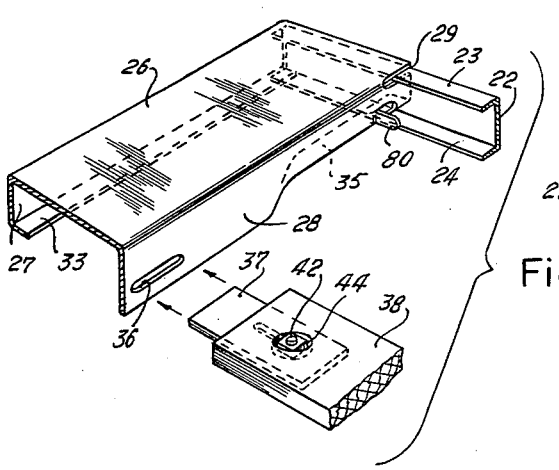
Fig. 5
Fig. 6
INVENTOR
Jesse B. Hutchinson
BY *Hastings Ashley*
ATTORNEY

United States Patent Office 3,058,770
Patented Oct. 16, 1962

3,058,770
MATERIAL HANDLING PLATFORM
Jesse B. Hutchinson, Dallas, Tex.
(822 Duncanville Road, P.O. Box 998, Duncanville, Tex.)
Filed Jan. 20, 1960, Ser. No. 3,582
4 Claims. (Cl. 296—28)

This invention relates to material handling devices and more particularly to platforms or flat bed structures for freight carts or the like.

An object of this invention is to provide a new and improved freight cart.

Another object is to provide a freight cart of simple and easily fabricated design.

A further object of the invention is to provide a freight cart having a flat bed structure provided with easily replaceable floor members.

A still further object of the invention is to provide a flat bed structure for carts, pallets and the like having a rectangular frame provided with inturned flanges for supporting removable floor members, such as boards.

A still further object of the invention is to provide a flat bed structure for freight carts and the like having a frame provided with longitudinal side channel members having inturned horizontal flanges on which opposite end edges of floor members may be supported and having a reinforcing bar or lock strap detachably connectable to transverse flanges of transverse end members of the frame connected to the side members for holding the floor board members in position in the frame.

Another object is to provide a flat bed structure which is of light weight and easily assembled from small components to provide a minimum deck height.

Additional objects and advantages of the invention will be readily apparent from the reading of the following description of a device constructed in accordance with the invention, and reference to the accompanying drawings thereof, wherein:

FIGURE 1 is a side view of a freight cart having the flat bed structure embodying the invention;

FIGURE 2 is an end view of the freight cart of FIGURE 1;

FIGURE 3 is a bottom view of the freight cart;

FIGURE 4 is a sectional view taken on line 4—4 of FIGURE 1;

FIGURE 5 is a fragmentary perspective view of the rectangular frame structure of the flat bed structure of the freight cart;

FIGURE 6 is a perspective end view of one of the transverse end channel members of the flat bed structure;

FIGURE 7 is a fragmentary sectional view similar to FIGURE 6 showing a modified form of the flat bed structure; and, FIGURE 8 is a view similar to FIGURE 5 showing another modified form of the flat bed structure.

Referring now to the drawings, the freight cart 10 includes a flat bed structure or platform 11 supported on front wheels 12 and rear casters 13 and having a vertical end frame 15 at the rear thereof. The platform or flat bed structure includes a rectangular frame 17 having inverted transverse rear and front end channel members 18a and 18b which extend between and are rigidly secured to the longitudinal side channels 20a and 20b. Each of the side channels includes a vertical web 22 and upper and lower parallel horizontal flanges 23 and 24, respectively.

The transverse end channels or members each include an upper horizontal web 26 and vertical parallel dependent outer and inner flanges 27 and 28, respectively. Slots 29 are provided on the end portions of the end channel members at the juncture of the horizontal webs 26 with the inner flanges 28 whereby the end members may be assembled on the end portions of the side channels with the extreme end portions of the horizontal webs overlying the upper flanges 23 of the side channels which are received in the slots 29. The extreme end edges of the upper flanges 23 abut the inner surfaces of the dependent outer flanges 27 of the end members 18a and 18b. The dependent outer flanges 27 are provided with inturned horizontal portions 33 which, when the end channel members are assembled on the side channels, rest upon the lower flanges 24 as illustrated in FIGURE 5. The inner flanges 28 of the end members 18a and 18b have end portions 35 thereof turned inwardly to provide clearance for the wheels.

The inner dependent flanges 28 of the end members are provided with elongate horizontal slots 36 in which are receivable the end plates 37 of the lock bar or batten 38. Each of the end plates is provided with a longitudinal slot 40. A bolt 42, having a nut 44, extends through each slot 40 and through an aligned aperture in the end of the lock bar to secure the end plates to the lock bar. The length of the lock bar is substantially equal to the distance between the inner flanges 28 of the end channel members 18a and 18b and the lock bar may be secured therebetween by means of the end plates 37 which may be loosened to move them to their retracted positions by rotation of the bolt 42 relative to its nut until the ends of the end plates do not project longitudinally outwardly of the ends of the lock bar 38. The end plates may then be slid between the end channel members until the ends of the end plates are aligned with the slots 36 of the inner flanges of the end channel members whereupon the end plates may be moved outwardly into the channel members and then secured in this position by rotation of the bolts relative to their nuts in an opposite direction whereby the lock bar is locked in place between and to the end channel members.

Transverse floor members or boards 50 interposed between the end channel members are supported by a pair of support strips 51a and 51b which are secured to the side channels 18a and 18b, by means of pairs of bolts 52. It will be seen that the outer vertical side surfaces of the support strips 51 abut the inner surfaces of the webs 22 of the side channels and that the lowermost surfaces of the strips 51a and 51b rest upon and are supported by the lower flanges 24. The bolts 52 of course extend through aligned apertures in the webs 22 and the support strips 51. Extreme outer edge portions of the floor boards 50 may be provided with recesses 55 whereby the upper surfaces of the upper flanges 23 of the side channels may be flush with the upper surfaces of the boards 50 between the upper flanges of the side channels. The upper surface of the lock bar bears against the lower surfaces of the floor boards.

The floor boards 50 or planking may be easily assembled and secured to the frame 17 by inverting the frame to the position illustrated in FIGURE 3 and then dropping the floor boards 50 into place. One end of each floor board is first tilted downwardly between the flanges of one side channel and the other end is then allowed to pivot downwardly past the flange 24 of the other side channel. The support strips 51 may then be secured in place by means of the bolts 52. The lock bar is then secured to the end channel members by sliding the end plates 37 thereof outwardly through the slots 36 of the inner flanges 28 of the end channel members 18a and 18b, then locking them in place by tightening the bolts 42.

Whenever it is desired to remove the floor boards 50, the bolts 52 are removed freeing the strips 51 for removal from the side channels 20a and 20b. The lock bar 38 is likewise removed by loosening the bolts 42 and moving the end plates 37 to their inner retracted positions. The floor boards 50 may then be easily removed by tilting one end higher than the other, the frame being in an inverted position, since the lower flanges 24 are of such width as to permit such removal of the boards.

It will thus be apparent that the platform or bed frame structure 11 may be easily assembled and disassembled.

If desired the lock bar or batten 38 may be of wood and the floor boards 50 or planking may be secured thereto by nails, bolts or the like. In this event, the floor boards 50 and the lock bar or batten 38 are assembled to the frame 17 as a unit, the end plates 37 being moved to inner retracted positions during assembly or disassembly of such unit with the frame 17.

It will further be seen that the provision of side channels with horizontal upper and lower flanges provided with removable longitudinal support strips resting on the lower flanges thereof permits easy assembly and disassembly of the boards 50 from the bed frame structure.

It will further be seen that the side and end channel members form a rigid rectangular structure providing great strength to the freight cart 10.

The base plate 60 of the caster wheels 13 may be rigidly secured to the lower surface of the horizontal web 26 of the rear transverse end channel member 18a by means of bolts 61 which extend through suitable apertures in the web and in the base plate, or by welding. A bracket 62 of course is rotatably secured to the base plate of the caster wheels in the usual manner whereby the caster wheels themselves may turn about vertical axes as required during the movement of the freight cart from one location to another. The caster wheels are mounted for rotation about horizontal axes on the brackets by shafts 63.

The front wheels 12 may be rotatably mounted on shafts 65 which extend through aligned apertures in pairs of brackets 65 whose vertical flanges 66 may be rigidly secured to the inner surface of the end portions 35 and to the web 26 of the front channel member 18b by any suitable means, such as welding.

The vertical end frame 15 may include a pair of corner angle members 70 whose rear portions abut adjacent outer end portions of the rear flange 27 of the rear transverse end channel member 18a and of the side channels 20 and may be rigidly secured thereto in any suitable manner, as by welding. Transverse straps 72 may extend between the angle members 70 of the frame and vertical straps 73 may extend between the transverse members and the outer flange 27 of the rear end channel member 26. The straps 72 and 73 of course are rigidly secured to one another at their points of intersection and to the angle members and to the rear flange 27 of the rear channel member in any suitable manner, as by welding. A horizontal rearwardly extending U-shaped handle member 74 may be secured to the upper ends of the angle members 70 of the end frame in any suitable manner, as by welding. A blackboard 75 and a receptacle 76 may also be secured in any suitable manner to the end frame.

The inner flanges 28 adjacent their outer ends may be provided with tabs 80 which may be bent outwardly to engage the inner surfaces of the support strips 51 adjacent the ends thereof in which event only one bolt 52 or no bolt may be employed intermediate the ends of each support strip. The tabs 80 would be bent into engagement with the support strip adjacent the ends to uphold the support strips in their operative positions.

In FIGURES 7 and 8 is illustrated a modified form of the flat bed structure wherein the floor boards or planking 50a and the lock bar or batten 38a may be assembled on the rectangular frame while the latter is in an upright position. The planking or floor boards 50a are of shorter length than the planks 50 whereby when the support strips 51 are removed, the floor boards and batten may be tilted as a unit to permit one end to clear the upper horizontal flanges of the side channel members 20 to permit assembly in or disassembly of the planking from the frame. If necessary, the planking may be bent slightly to force it to clear the inner edge of one of the horizontal flanges when the other end is tilted downwardly.

The inner flanges 28a of the end channels are provided, instead of with the slots 36, with inwardly turned support tabs 82 on which are adapted to be supported the opposite end portions of the lock bar or batten 38a when the planking and batten as a unit are assembled on the rectangular frame.

The lower flanges 24 of the channel members 20c may be of substantially the same or longer length than the upper horizontal flanges 23a so that the supporting strips may be retained in their operative positions by inturning outer edge portions 83 of the lower flanges, as by means of hammer blows, after the planking and batten have been positioned in place whereby the inturned portions 83 may serve in lieu of the bolts 52 and the lugs 80 to retain the support strips in their operative positions.

It will now be seen that a new and improved material handling or transporting device has been illustrated and described which includes a platform or flat bed structure 11 having a rectangular frame and that the frame is formed of a pair of longitudinal side channels or members having vertical webs and inturned upper and lower vertically spaced flanges.

It will further be seen that inverted end channel members 18a and 18b extend between and rigidly secured to end portions of the side channels and that the end channel members have dependent flanges 27 and 28.

It will further be seen that the inner dependent flanges 28 of the frame are provided with slots whereby a lock bar which extends between the side channels and parallel to the side channels and between the inner flanges may be rigidly secured thereto and locked in place by means of end plates 37 extendable into the slots of the inner flanges of the end channel members to prevent movement of the lock bar relative to the frame 17.

It will further be seen that a plurality of floor board members or boards 50 disposed between the inner flanges of the end channel members and extending into the side channels are removably supported in place by the lock bar and by support strips 51 secured to the side channels and supported on the lower flanges 24 thereof.

It will further be seen that the rectangular frame 17 may be easily and rigidly secured together in any suitable manner, as by welding, and that the floor boards 50 may be easily installed and removed from the frame merely by removing the two bolts 52 of each side strip 51 and removing the lock bar 38.

It will further be seen that since the outer edge portions of the floor boards 50 rest upon the support strips 51, overlain by the upper flanges 23 of the side channels, extreme accuracy in cutting the floor boards is not necessary since even if the various boards are of different lengths or if the ends thereof are cut at an angle to the longitudinal axis thereof, such ends of the boards are hidden from view.

It will further be seen that the flat bed or platform structure 11 is of simple economical construction, is easily assembled and disassembled, and is formed of a minimum of parts.

It will further be seen that the flat bed bed structure or platform may be used as a cart if provided with wheels or as a pallet if not provided with wheels.

It will further be seen that if desired, the boards 50 and lock bar 38 may both be of wood and secured together to form a unit which is easily assembled on or disassembled from the rectangular frame 17.

It will further be seen that various means for holding the support strips 51, such as the tabs 80 of the inner flanges 28 of the end channel members, the inturned portions 83 of the lower flanges 24a, or the bolts 52, may be employed to hold the support strips 52 in position.

It will be apparent that in the event the end portions 83 of the flanges 24a are employed to hold the support strips 51 in position, such inturned portions have to be bent outwardly and downwardly by any suitable tool when it is desired to remove the floor boards or planking from the rectangular frame.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A platform for carts and the like including: a rectangular frame including a pair of longitudinal side members having inturned vertically spaced upper and lower horizontal flanges; longitudinally spaced end members extending between and connected to said side members; a support strip supported on the lower flange of each of said side frame members and detachably secured thereto; a plurality of transverse members between said end members and having opposite end portions disposed between the support strips and the upper inturned flanges of the side members; and a lock bar disposed between said side members and extending longitudinally between and detachably secured to said end members for supporting said transverse members, said end members having horizontal webs and dependent vertical outer and inner flanges, said inner flanges having elongate slots, said lock bar having extendable lock means receivable in said slots for detachably securing said lock bar to said end members.

2. A platform for carts and the like including: a rectangular frame including a pair of longitudinal side members having inturned vertically spaced upper and lower horizontal flanges, said lower horizontal flanges being of lesser width than said upper horizontal flange; longitudinally spaced end members extending between and connected to said side members, said end members having horizontal webs and dependent vertical outer and inner flanges, said inner flanges having elongate slots; a plurality of transverse members between said end members and having opposite end portions supported by said side members; and a lock bar disposed between said side members and extending longitudinally between said end members for locking said transverse members against removal from said frame, said lock bar having extendable lock means receivable in said slots for detachably securing said lock bar to said end members.

3. A platform for carts and the like including: a rectangular frame including a pair of longitudinal side members having inturned vertically spaced upper and lower horizontal flanges; longitudinally spaced end members extending between and connected to said side members; a support strip supported on the lower flange of each of said side frame members and detachably secured thereto; a plurality of transverse members between said end members and having opposite end portions disposed between the support strips and the upper inturned flanges of the side members; and a lock bar disposed between said side members and extending longitudinally between and detachably secured to said end members for supporting said transverse members, said end members having horizontal webs and dependent vertical outer and inner flanges, said inner flanges having elongate slots, said lock bar having extendable lock means receivable in said slots for detachably securing said lock bar to said end members, said end members having outwardly opening recesses at opposite ends thereof at upper portions of said inner flanges, said upper flanges being disposed in said recesses.

4. A platform for carts and the like including: a rectangular frame including a pair of longitudinal side members having inturned vertically spaced upper and lower horizontal flanges, said lower horizontal flanges being of lesser width than said upper horizontal flange; longitudinally spaced end members extending between and secured to said side members, said end members having horizontal webs and dependent vertical outer and inner flanges, said inner flanges having elongate slots; a lock bar, said lock bar having extendable lock means receivable in said slots for detachably securing said lock bar to said end members, said end members having outwardly opening recesses at opposite ends thereof at upper portions of said inner flanges, said upper flanges being disposed in said recesses.

References Cited in the file of this patent
UNITED STATES PATENTS

| | | |
|---|---|---|
| 1,832,774 | Hallowell et al. | Nov. 17, 1931 |
| 2,307,149 | Milz et al. | Jan. 5, 1943 |
| 2,751,233 | Racker | June 19, 1956 |
| 2,794,611 | Sjoblom et al. | June 4, 1957 |